(12) United States Patent
Itoga et al.

(10) Patent No.: US 7,710,447 B2
(45) Date of Patent: May 4, 2010

(54) OPTICAL DISK IMAGE FORMING APPARATUS AND OPTICAL DISK IMAGE FORMING METHOD

(75) Inventors: Hisanori Itoga, Hamamatsu (JP); Seiya Yamada, Hamamatsu (JP); Tatsuo Fushiki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 36 days.

(21) Appl. No.: 11/600,875

(22) Filed: Nov. 17, 2006

(65) Prior Publication Data

US 2007/0212033 A1 Sep. 13, 2007

(30) Foreign Application Priority Data

Nov. 17, 2005 (JP) ............................. 2005-332754
Aug. 29, 2006 (JP) ............................. 2006-232550

(51) Int. Cl.
*B41J 2/47* (2006.01)

(52) U.S. Cl. ...................................... 347/251

(58) Field of Classification Search ....................... None
See application file for complete search history.

(56) References Cited

U.S. PATENT DOCUMENTS

2003/0231561 A1  12/2003  Morishima

| | | | |
|---|---|---|---|
| 2004/0037176 A1* | 2/2004 | Morishima | ............... 369/44.26 |
| 2004/0141721 A1 | 7/2004 | Hatalsky | |
| 2005/0019522 A1* | 1/2005 | McClellan | ................. 428/64.4 |
| 2005/0219583 A1* | 10/2005 | Foster et al. | ................. 358/1.9 |

FOREIGN PATENT DOCUMENTS

| | | |
|---|---|---|
| EP | 0 517 519 A2 | 12/1992 |
| EP | 1 110 740 A1 | 6/2001 |
| EP | 1 367 570 A2 | 12/2003 |
| EP | 1 439 537 A2 | 7/2004 |
| JP | 2002-367173 A | 12/2002 |

OTHER PUBLICATIONS

European Search Report dated Mar. 8, 2007 (Seven (7) pages).

\* cited by examiner

*Primary Examiner*—Matthew Luu
*Assistant Examiner*—Kendrick X Liu
(74) *Attorney, Agent, or Firm*—Crowell & Moring LLP

(57) ABSTRACT

An optical disk image forming apparatus that forms an image on an optical disk, comprises: an optical disk drive that includes a rotating unit for rotating an optical disk and a laser light irradiating unit being movable in a radial direction of the optical disk; and a control unit that sets a plurality of pixel areas on the optical disk, allocates predetermined writing densities to the plurality of pixel areas, respectively, and controls the optical disk drive to irradiate the laser light onto each pixel area according to the allocated writing densities. When the allocated writing density is a halftone writing density, the control unit corrects the halftone writing density so as to be lighter darker than the allocated writing density.

7 Claims, 9 Drawing Sheets

RELATIONSHIP BETWEEN VISUAL CHARACTERISTIC
VALUE AND DENSITY CONVERSION

FIG. 6

VISUAL CHARACTERISTIC VALUE α = 1.55

| NUMBER OF REVOLUTIONS | GRAY-SCALE DATA | DENSITY OF ORIGINAL IMAGE | DENSITY OF IMAGE AFTER CORRECTION |
|---|---|---|---|
| 0 | (0000) | 0.00 | 0.00 |
| 1 | (0001) | 0.07 | 0.02 |
| 2 | (0010) | 0.13 | 0.04 |
| 3 | (0011) | 0.20 | 0.08 |
| 4 | (0100) | 0.27 | 0.13 |
| 5 | (0101) | 0.33 | 0.18 |
| 6 | (0110) | 0.40 | 0.24 |
| 7 | (0111) | 0.47 | 0.31 |
| 8 | (1000) | 0.53 | 0.38 |
| 9 | (1001) | 0.60 | 0.45 |
| 10 | (1010) | 0.67 | 0.53 |
| 11 | (1011) | 0.73 | 0.62 |
| 12 | (1100) | 0.80 | 0.71 |
| 13 | (1101) | 0.87 | 0.80 |
| 14 | (1110) | 0.93 | 0.90 |
| 15 | (1111) | 1.00 | 1.00 |

FIG. 7

(ON/OFF TABLE OF LASER LIGHT)

| | GRAY-SCALE DATA | | | | | | | | | | | | | | | |
|---|---|---|---|---|---|---|---|---|---|---|---|---|---|---|---|---|
| | 0000 | 0001 | 0010 | 0011 | 0100 | 0101 | 0110 | 0111 | 1000 | 1001 | 1010 | 1011 | 1100 | 1101 | 1110 | 1111 |
| 1ST REVOLUTION | OFF | ON | ON | ON | ON | ON | ON | ON | ON | ON | ON | ON | ON | ON | ON | ON |
| 2ND REVOLUTION | OFF | OFF | ON | ON | ON | ON | ON | ON | ON | ON | ON | ON | ON | ON | ON | ON |
| 3RD REVOLUTION | OFF | OFF | OFF | ON | ON | ON | ON | ON | ON | ON | ON | ON | ON | ON | ON | ON |
| 4TH REVOLUTION | OFF | OFF | OFF | OFF | ON | ON | ON | ON | ON | ON | ON | ON | ON | ON | ON | ON |
| 5TH REVOLUTION | OFF | OFF | OFF | OFF | OFF | ON | ON | ON | ON | ON | ON | ON | ON | ON | ON | ON |
| 6TH REVOLUTION | OFF | OFF | OFF | OFF | OFF | OFF | ON | ON | ON | ON | ON | ON | ON | ON | ON | ON |
| 7TH REVOLUTION | OFF | OFF | OFF | OFF | OFF | OFF | OFF | ON | ON | ON | ON | ON | ON | ON | ON | ON |
| 8TH REVOLUTION | OFF | OFF | OFF | OFF | OFF | OFF | OFF | OFF | ON | ON | ON | ON | ON | ON | ON | ON |
| 9TH REVOLUTION | OFF | OFF | OFF | OFF | OFF | OFF | OFF | OFF | OFF | ON | ON | ON | ON | ON | ON | ON |
| 10TH REVOLUTION | OFF | OFF | OFF | OFF | OFF | OFF | OFF | OFF | OFF | OFF | ON | ON | ON | ON | ON | ON |
| 11TH REVOLUTION | OFF | OFF | OFF | OFF | OFF | OFF | OFF | OFF | OFF | OFF | OFF | ON | ON | ON | ON | ON |
| 12TH REVOLUTION | OFF | OFF | OFF | OFF | OFF | OFF | OFF | OFF | OFF | OFF | OFF | OFF | ON | ON | ON | ON |
| 13TH REVOLUTION | OFF | OFF | OFF | OFF | OFF | OFF | OFF | OFF | OFF | OFF | OFF | OFF | OFF | ON | ON | ON |
| 14TH REVOLUTION | OFF | OFF | OFF | OFF | OFF | OFF | OFF | OFF | OFF | OFF | OFF | OFF | OFF | OFF | ON | ON |
| 15TH REVOLUTION | OFF | OFF | OFF | OFF | OFF | OFF | OFF | OFF | OFF | OFF | OFF | OFF | OFF | OFF | OFF | ON |

FIG. 9

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 0 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 1 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 2 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 3 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 4 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 5 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 6 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 7 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 8 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 9 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 10 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 11 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 12 | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF | OFF |
| 13 | OFF | OFF | OFF | OFF | OFF | OFF | OFF | OFF | OFF | OFF | OFF | ON | ON | OFF | OFF | OFF | OFF | OFF | OFF | OFF | OFF | OFF | OFF | OFF |
| 14 | OFF | OFF | OFF | OFF | OFF | OFF | OFF | OFF | OFF | OFF | ON | ON | ON | ON | OFF | OFF | OFF | OFF | OFF | OFF | OFF | OFF | OFF | OFF |
| 15 | OFF | OFF | OFF | OFF | OFF | OFF | OFF | OFF | OFF | ON | ON | ON | ON | ON | ON | OFF | OFF | OFF | OFF | OFF | OFF | OFF | OFF | OFF |
| 16 | OFF | OFF | OFF | OFF | OFF | OFF | OFF | OFF | ON | ON | ON | ON | ON | ON | ON | ON | OFF | OFF | OFF | OFF | OFF | OFF | OFF | OFF |
| 17 | OFF | OFF | OFF | OFF | OFF | OFF | OFF | ON | ON | ON | ON | ON | ON | ON | ON | ON | ON | OFF | OFF | OFF | OFF | OFF | OFF | OFF |
| 18 | OFF | OFF | OFF | OFF | OFF | OFF | ON | ON | ON | ON | ON | ON | ON | ON | ON | ON | ON | ON | OFF | OFF | OFF | OFF | OFF | OFF |
| 19 | OFF | OFF | OFF | OFF | OFF | ON | ON | ON | ON | ON | ON | ON | ON | ON | ON | ON | ON | ON | ON | OFF | OFF | OFF | OFF | OFF |
| 20 | OFF | OFF | OFF | OFF | ON | ON | ON | ON | ON | ON | ON | ON | ON | ON | ON | ON | ON | ON | ON | ON | OFF | OFF | OFF | OFF |
| 21 | OFF | OFF | OFF | ON | ON | ON | ON | ON | ON | ON | ON | ON | ON | ON | ON | ON | ON | ON | ON | ON | ON | OFF | OFF | OFF |
| 22 | OFF | OFF | ON | ON | ON | ON | ON | ON | ON | ON | ON | ON | ON | ON | ON | ON | ON | ON | ON | ON | ON | ON | OFF | OFF |
| 23 | OFF | ON | ON | ON | ON | ON | ON | ON | ON | ON | ON | ON | ON | ON | ON | ON | ON | ON | ON | ON | ON | ON | ON | OFF |
| 24 | ON | ON | ON | ON | ON | ON | ON | ON | ON | ON | ON | ON | ON | ON | ON | ON | ON | ON | ON | ON | ON | ON | ON | ON |

OPTICAL DISK IMAGE FORMING APPARATUS AND OPTICAL DISK IMAGE FORMING METHOD

BACKGROUND OF THE INVENTION

The present invention relates to an optical disk recording apparatus that forms images, such as characters or pictures, on a label surface or a recording surface of an optical disk and an optical disk image forming method.

There is disclosed a technology for an optical disk recording apparatus that forms images, such as characters or pictures, on a data recording surface or a label surface of a recordable optical disk, such as CD-R or CD-RW, on which data can be recorded (for example, see Patent Document 1). Patent Document 1: JP-A-2002-367173

An optical disk recording apparatus disclosed in Patent Document 1 forms one pixel by plural tracks, in which multiple-values of the pixel are expressed by the number and arrangement of the tracks so as to obtain a multi gray-scale levels with binary recording system. When the image is formed on the optical disk with the above method of the optical recording apparatus, however, there is a problem that a viewer recognizes that density (gray scale level) of the original image seems is different from that of the image formed on the optical disk.

SUMMARY OF THE INVENTION

The invention has been made in order to solve the above-described problems, and an object of the invention is to provide an optical disk image forming apparatus and an optical disk image forming method that can form on an optical disk an image in which the visibility of the image is the same as that of an original image.

In order to solve the above-described problems, the invention has the following configuration.

(1) An optical disk image forming apparatus that forms an image constituted by a plurality of pixels on an optical disk by irradiating laser light onto the optical disk including a color changing layer, the color changing layer being capable of changing a characteristic of a color by the laser light, the optical disk image forming apparatus comprising:

an optical disk drive that includes a rotating unit for rotating the optical disk and a laser light irradiating unit being movable in a radial direction of the optical disk; and a control unit that virtually sets a plurality of pixel areas on the optical disk, allocates predetermined writing densities to the plurality of pixel areas based on image data representing the image to be formed, respectively, and controls the optical disk drive to irradiate the laser light onto each pixel area according to the allocated writing densities, wherein, when the allocated writing density is a halftone writing density, the control unit corrects the halftone writing density so as to be darker than the allocated writing density.

(2) The optical disk image forming apparatus according to (1), wherein the control unit controls the optical disk drive to irradiate the laser light onto each pixel area by a number of times or for an amount of time corresponding to the corrected writing density.

(3) The optical disk image forming apparatus according to (1), wherein a coefficient for correcting the writing density by the control unit is set according to a number of times or an amount of time the laser light passes the pixel area.

(4) The optical disk image forming apparatus according to (1), wherein the control unit defines the pixel area by a central angle and a pixel length which is a length in a radial direction so that the plurality of pixel areas overlap one another at an interval shorter than the pixel length in the radial direction.

(5) The optical disk image forming apparatus according to (1), wherein the control unit controls the laser light irradiating unit to irradiate and vibrate the laser light in the radial direction within the pixel length.

(6) A method of forming an image constituted by a plurality of pixels on an optical disk by irradiating laser light onto the optical disk including a color changing layer, the color changing layer being capable of changing a characteristic of a color by the laser light, the method comprising:

virtually setting a plurality of pixel areas on the optical disk;

allocating predetermined writing densities to the plurality of pixel areas based on image data representing the image to be formed, respectively;

correcting, when the allocated writing density is a halftone writing density, the halftone writing density so as to be darker than the allocated writing density;

irradiating the laser light onto the optical disk with moving a laser light irradiating unit in a radial direction of the optical disk while a rotating unit rotates the optical disk based on the corrected writing density.

(7) The method according to (6) further comprising setting control condition so as to irradiate the laser light onto each pixel area by a number of times or for an amount of time corresponding to the corrected writing density, wherein the laser light is irradiated on the optical disk based on the control condition.

With this arrangement, when forming an image on a color changing layer of an optical disk, the optical disk image forming apparatus irradiates laser light onto each pixel area defined as a predetermined central angle and a pixel length as a predetermined length in the radial direction by the number of revolutions or for an amount of time corresponding the writing density so as to form an image of a predetermined density (a plurality of pixels). In this case, when the original image is formed on the optical disk, a viewer recognizes the difference in density (gray scale level) between the original image and the image formed on the optical disk. Accordingly, in order to compensate a variation in density, the optical disk image forming apparatus corrects the halftone writing density so as to be darker than the allocated writing density. Therefore, it is possible to make visibility of the image formed on the optical disk same as the original image.

With this configuration, the coefficient for correcting the writing density of the halftone to be darker than the allocated writing density is set to a value according to the number of times or an amount of time the laser light passes the pixel area. Accordingly, the image density can be suitably corrected and the visibility of the image formed on the optical disk can be made same as the original image.

With this configuration, each pixel area of the image formed on the optical disk is set so that the plurality of pixel areas overlap one another at an interval shorter than the pixel length in the radial direction. Accordingly, since pixel areas overlap one another, a gap is not generated between pixel areas and it is possible to prevent a radial stripe from being generated in the image formed on the optical disk due to light interference.

According to the present invention, the writing density of the halftone of the image to be formed on the optical disk is corrected so as to be darker than the allocated writing density. Therefore, it is possible to make visibility of the image formed on the optical disk same as the original image.

BRIEF DESCRIPTION OF THE DRAWINGS

FIG. 6 is a table showing a density before correction and a density after correction when an image having 16 gray-scale levels is formed.

FIG. 7 is a table showing the conversion contents of a data converter.

FIG. 9 is a diagram showing a gray-scale display pattern based on a duty ratio.

DETAILED DESCRIPTION OF PREFERRED EMBODIMENTS

An optical disk image forming apparatus according to an embodiment of the invention has an image forming function of forming an image on an optical disk, in addition to an information recording function on an optical disk and an information reading function of the optical disk of an optical disk recording/reproducing apparatus. The optical disk image forming apparatus according to the embodiment of the invention has a function of correcting the gray-scale level of the image formed on the optical disk so as to make the density of the image formed on the optical disk same as the original image, thereby making visibility of the image formed on the optical disk same as the original image. In order to prevent a gap from being generated between rows of an image formed on an optical disk, the optical disk image forming apparatus according to the embodiment of the invention forms an image such that some of pixels of each row overlap pixels of a plurality of adjacent rows.

First, the configuration of the optical disk image forming apparatus will be described. Since a function of recording information on a recording surface of an optical disk and a function of reading out information recorded on a recording surface of an optical disk are known, the descriptions thereof will be omitted. In the following description, a case where an image is formed on an optical disk having a color changing layer provided at a label surface of, for example, a DVD-R will be described, but the invention is not limited thereto. It is possible to form an image on other kinds of recordable optical disks.

<Configuration of Optical Disk Image Forming Apparatus>

Figure 1:
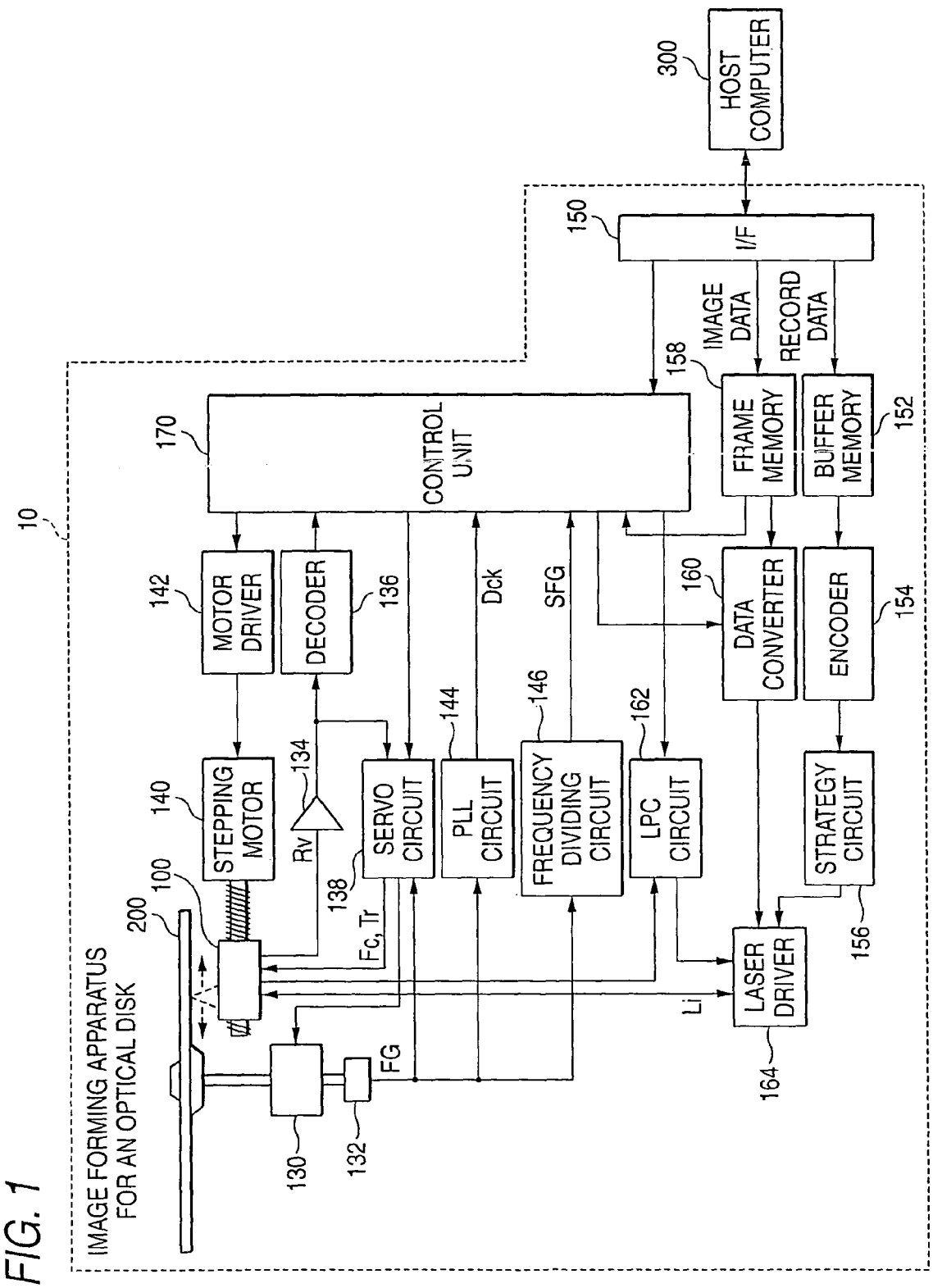
FIG. 1 is a block diagram showing the schematic construction of an optical disk image forming apparatus according to an embodiment of the invention.

FIG. 1 is a block diagram showing the schematic configuration of an optical disk image forming apparatus according to an embodiment of the invention. As shown in FIG. 1, an optical disk image forming apparatus 10 includes an optical pick-up 100, a spindle motor 130, a rotation detector 132, a RF (Radio Frequency) amplifier 134, a decoder 136, a servo circuit 138, a stepping motor 140, a motor driver 142, a PLL (Phase Locked Loop) circuit 144, a frequency dividing circuit 146, an interface 150, a buffer memory 152, an encoder 154, a strategy circuit 156, a frame memory 158, a data converter 160, a LPC (Laser Power Control) circuit 162, a laser driver 164, and a control unit 170. The optical disk image forming apparatus 10 is connected to a host computer 300 through the interface 150.

In the following description, it is assumed that the optical disk image forming apparatus 10 records information or forms an image on an optical disk 200 in a CAV (Constant Angular Velocity) mode. Other modes, such as a CLV (Constant Linear Velocity) mode or a ZCLV (Zone Constant Linear Velocity) mode, can be applied to the invention.

The spindle motor 130 rotates the optical disk 200 held by a holding mechanism (not shown).

The rotation detector 132 outputs a signal FG having a frequency according to a spindle rotation velocity using a counter electromotive current of the spindle motor 130.

The optical pick-up 100 has a laser diode (not shown), a plurality of lenses, such as objective lenses, a tracking servo mechanism, a focus servo mechanism, and the like. The optical pick-up 100 irradiates laser light focused by the lenses onto the revolving optical disk 200.

The stepping motor 140 rotates to move the optical pick-up 100 in a radial direction of the optical disk 200.

The motor driver 142 outputs a driving signal for moving the optical pick-up 100 in a direction and by a distance according to an instruction from the control unit 170 to the stepping motor 140 so as to perform a thread control.

The RF amplifier 134 amplifies a light receiving signal Rv output from the optical pick-up 100 and outputs the amplified signal to the decoder 136 and the servo circuit 138.

When the recording surface of the optical disk 200 is reproduced and information recorded on the optical disk 200 is read out, the light receiving signal Rv output from the optical pick-up 100 is subjected to 8-to-16 modulation. Accordingly, the decoder 136 demodulates the 8-to-16 modulated signal and outputs the demodulated signal to the control unit 170.

The servo circuit 138 performs a feedback control (rotation control) such that the rotation velocity of the spindle motor 130 detected by the signal FG becomes an angular velocity according to an instruction from the control unit 170. Further, the servo circuit 138 performs a tracking control and a focus control for the optical pick-up 100, in addition to the rotation control.

The PLL circuit 144 generates a clock signal Dck that is synchronous with the signal FG and has a frequency corresponding to a multiple of the frequency of the signal FG, and supplies the generated clock signal Dck to the control unit 170.

The frequency dividing circuit 146 generates a reference signal SFG by frequency-dividing the signal FG by a predetermined number and supplies the reference signal SFG to the control unit 170.

Although the detailed configuration of the control unit 170 is not shown, the control unit 170 includes a CPU, a ROM, a RAM, and the like. The control unit 170 operates individual units according to a program stored in the ROM so as to record information on the recording surface of the optical disk 200 or to form an image on the recording surface or the label surface of the optical disk 200. Further, when an image is formed to the optical disk 200, the control unit 170 corrects the density (gray-scale level) of each pixel, which will be described below.

The interface (I/F) 150 is an interface through which the optical disk image forming apparatus 10 receives information such as image (hereinafter referred to original image) supplied from a host computer 300.

When information to be recorded on the recording surface of the optical disk 200 (hereinafter, referred to as record data) is supplied from the host computer 300 through the interface 150, the buffer memory 152 stores the record data in an FIFO (First In, First Out) method.

The encoder 154 performs the 8-to-16 modulation on the record data read out from the buffer memory 152 and outputs the modulated signal to the strategy circuit 156.

The strategy circuit 156 performs a time axis correction processing on the 8-to-16 modulated signal supplied from the encoder 154 and outputs the corrected signal to the laser driver 164.

When information of an image to be formed on the optical disk 200 (hereinafter, referred to as image data) is supplied from the host computer 300 through the interface 150, the frame memory 158 accumulates the image data. The image data is a set of gray-scale data defining the densities of the individual pixels P of the image to be rendered on the disc-shaped optical disk 200.

In order to form the image on the optical disk 200, the data converter 160 converts the intensity of laser light into a signal indicating a write level or a servo level according to the gray-scale data read out from the frame memory 158 and the number of revolutions on the basis of an instruction from the control unit 170, and outputs the converted data to the laser driver 164. Here, the write level means intensity enough to change the color of a color changing layer of the optical disk when laser light is irradiated, and the servo level means intensity almost not causing a change in color of the color changing layer of the optical disk even though the laser light is irradiated.

The laser power control circuit 162 controls the intensity of laser light irradiated from a laser diode (not shown). Specifically, the laser power control circuit 162 controls a current value of a driving signal Li such that the amount of emergent light of the laser diode (not shown) detected by a front monitor diode (not shown) is consistent with a target value of optimum laser power supplied by the control unit 170.

Upon information recording, the laser driver 164 generates the driving signal Li, in which the control content of the laser power control circuit 162 reflects, according to modulated data supplied from the strategy circuit 156 and supplies the generated driving signal Li to the laser diode of the optical pick-up 100. Further, upon image formation, the laser driver 164 generates the driving signal Li, in which the control content of the laser power control circuit 162 reflects, according to the data converted by the data converter 160 and supplies the generated driving signal Li to the laser diode of the optical pick-up 100. Accordingly, the intensity of the laser beam from the laser diode is subject to the feedback control so as to be consistent with the target value to be supplied from the control unit 170.

<Irradiation Locus of Laser Light>

Figure 2:
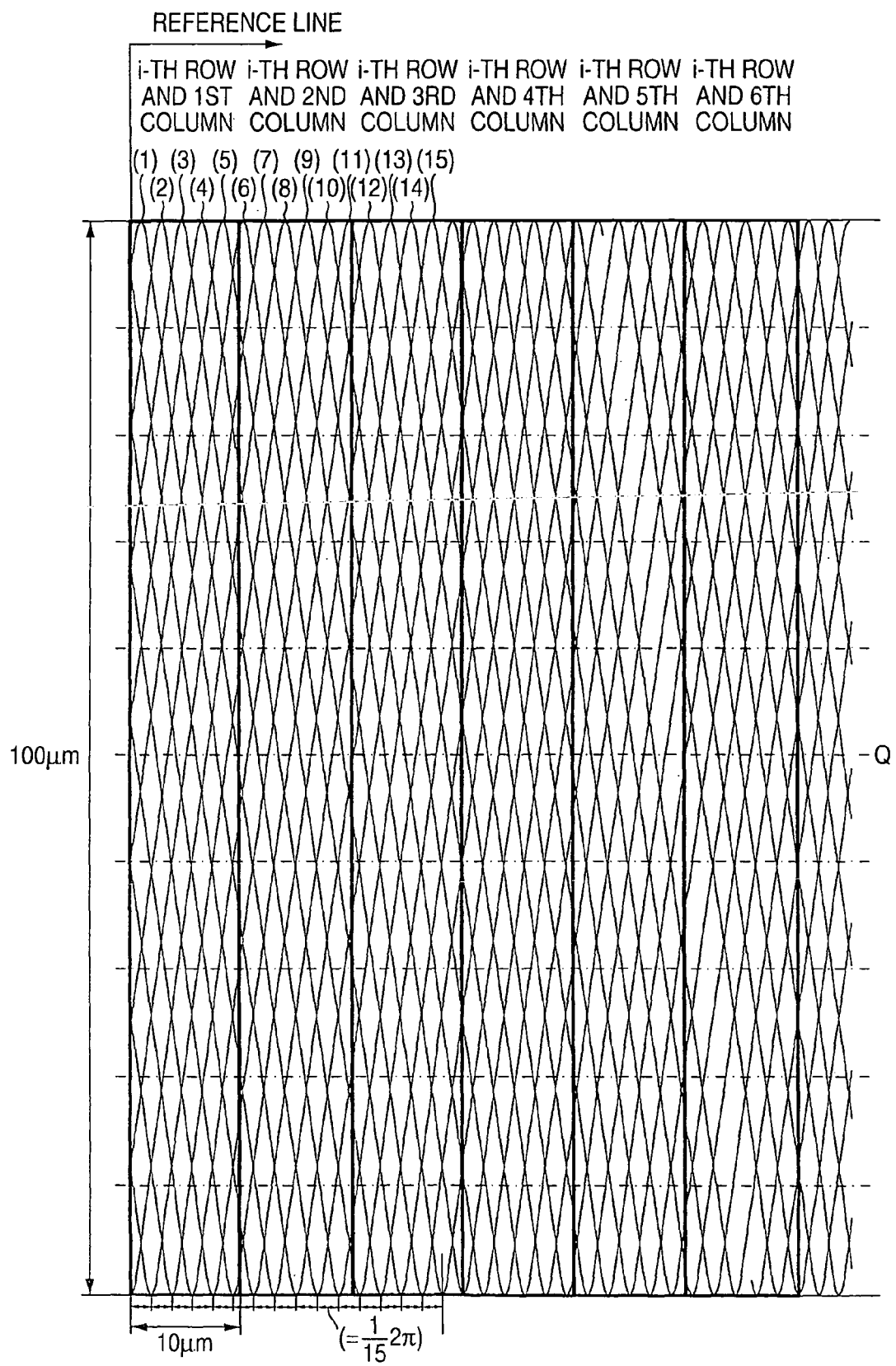
FIG. 2 is a diagram showing an example of the irradiation locus of laser light.

FIG. 2 is a diagram showing an example of the irradiation locus of laser light. In FIG. 2, rows and columns are obtained by developing rows and columns virtually arranged on the optical disk in a planar manner. The radial direction of the optical disk refers to rows and a circumferential direction thereof refers to columns. The rows are obtained by dividing the radius and are disposed to have a first width. The columns are disposed to have a width obtained by dividing the circumference by a predetermined number. The column width is expressed by an angle on the optical disk and is expressed by a time during the recording operation. When images, such as characters or pictures, are disposed on the optical disk, gray-scale levels are extracted from the images by associating the images with individual pixel ranges and then are set as image formation data. An image is formed by irradiating a laser beam at high or low intensity according to each gray-scale level of the image formation data. In FIG. 2, the vibration center Q of the laser beam is located at the center of the rows.

Figure 8:
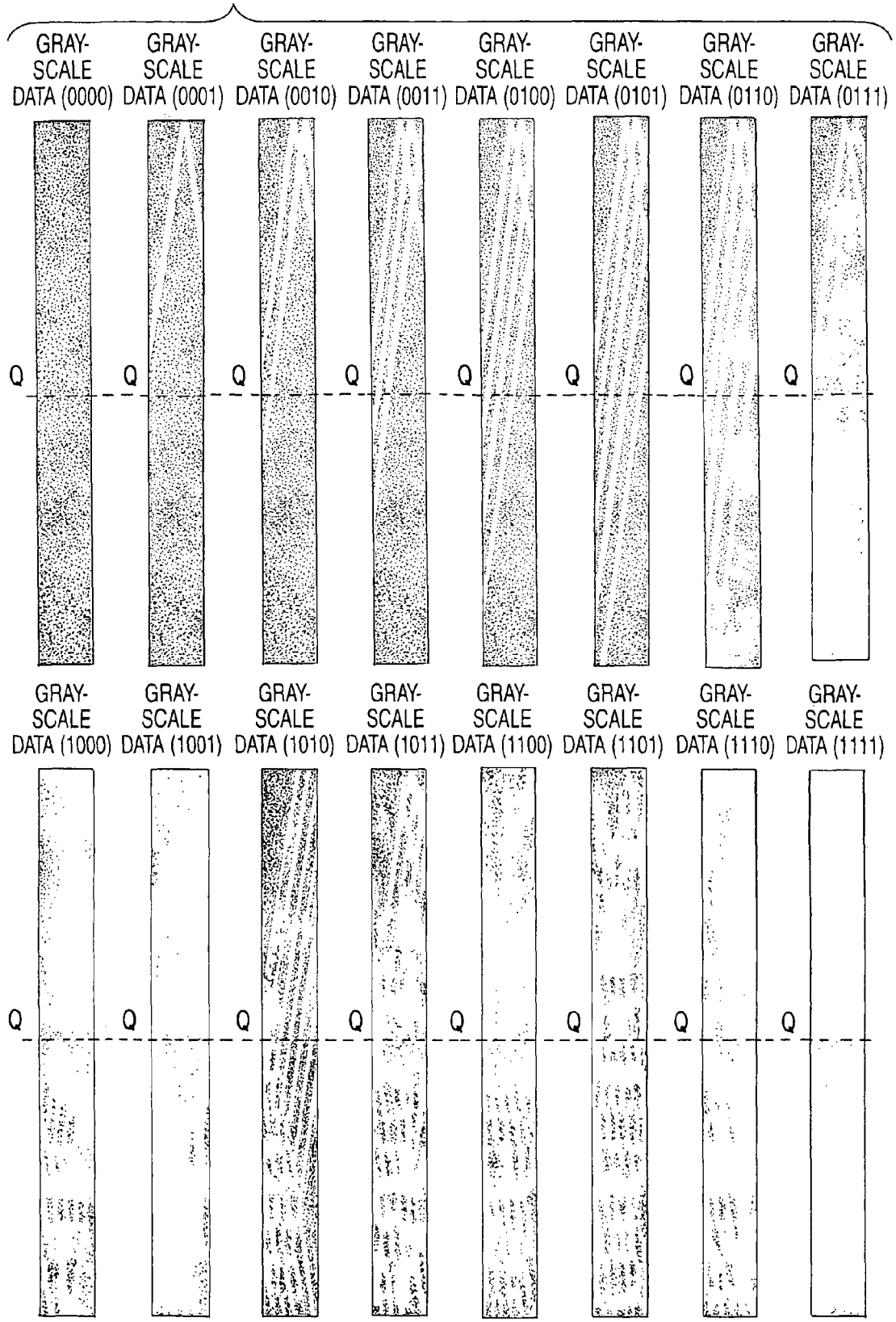
FIG. 8 is a diagram showing the state of one pixel whose color is changed by laser light irradiated on the basis of gray-scale data.

When an image having 16 gray-scale levels is formed on the optical disk 20, the optical disk image forming apparatus 10 forms individual pixels for one row of the image by rotating the optical disk 200 fifteen times such that laser light passes through each pixel fifteen times. Specifically, when a timing at which laser light passes through a reference line is set to zero of a time axis, the control unit 170 instructs the servo circuit 138 to generate, as a tracking signal Tr, a triangular wave signal in which the phase is zero in a first revolution and is subsequently delayed by $2\pi/15$ in a second revolution and later. When the tracking signal Tr is supplied to the optical pick-up 100, as shown in FIG. 8, the irradiation locus of laser light onto the optical disk 200 has an amplitude of approximately 100 μm, and varies from the locus (1) of the first revolution to the locus (15) of the fifteenth revolution.

Here, the minimum movement resolution of the optical pick-up 100 by the stepping motor 140 is approximately 10 μm, and the resolution of a switchable distance of laser power in the circumferential direction is approximately 10 μm. Then, the size of one pixel is set to 100 μm×10 μm. The spot diameter of laser light that is irradiated from the optical pick-up 100 onto the color changing layer of the optical disk 200 is approximately 1 μm.

In the optical disk image forming apparatus 10, when an image having 16 gray-scale levels is formed, it is assumed that gray-scale data is 4 bits and gray-scale data of (0000) defines the darkest (deepest) density, and then the formation of a dot of a brighter (lighter) density is instructed in an order of (0001), (0010), (0011), (0100), (0101), (0110), (0111), (1000), (1001), (1010), (1011), (1100), (1101), (1110), and (1111).

Figure 3:
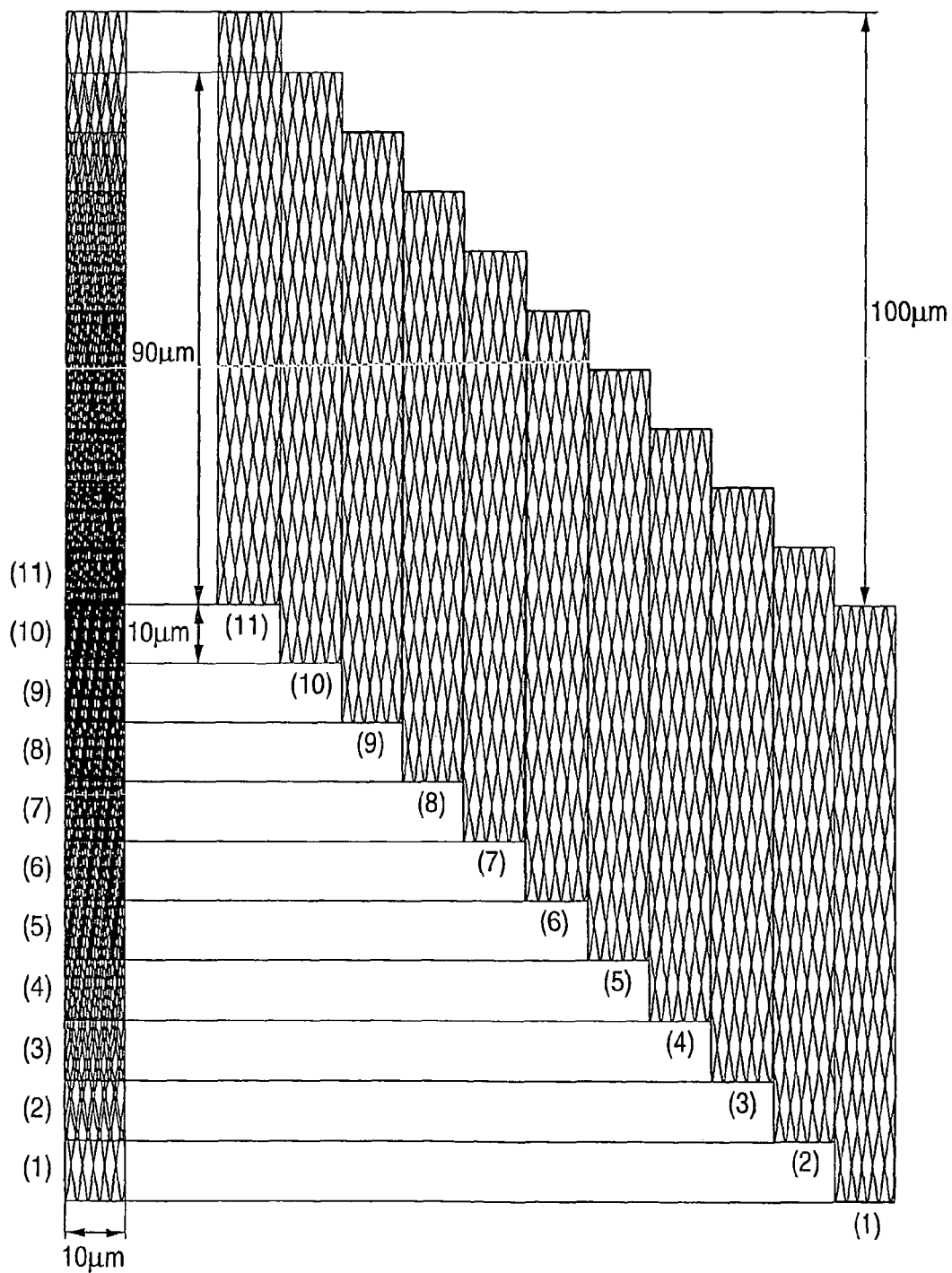
FIGS. 3A and 3B are diagrams showing a state where pixels of each row overlap pixels of adjacent rows.

FIGS. 3A and 3B are diagrams showing a state where the pixels of each row overlap the pixels of adjacent rows. FIG. 3A shows one column of the image and FIG. 3B shows a state where the pixels of the i-th column are horizontally developed so as not to be overlapped. In FIG. 3A, for convenience, the irradiation locus of laser light is not shown. As described above with reference to FIG. 2, in order to form an image having 16 gray-scale levels on the optical disk 200 along the irradiation locus of laser light, when the pixels corresponding to one row of the image are formed by rotating the optical disk 200 fifteen times, the optical disk image forming apparatus 10 moves the optical pick-up 100 by 10 μm that is the minimum movement resolution of the optical pick-up 100 by the stepping motor 140. By repeating this operation, the optical disk image forming apparatus 10 forms the image, in which a plurality of adjacent rows partially overlap one another as shown in FIG. 3A, on the recording surface or the label surface of the optical disk 200. In the example shown in FIG. 3A, the pixels of each row overlap the pixels of adjacent rows by 90 μm in the radial direction of the optical disk 200.

As such, when an image in which each row partially overlaps a plurality of adjacent rows is formed, it is possible to prevent a gap from being generated between rows of the image formed on the optical disk 200. As a result, it is possible to prevent a radial stripe from being generated in the image formed on the optical disk 200 due to light interference.

<Correction of Visual Characteristic>

As described above, when an image is formed by switching the intensity of laser light every revolution, it is possible to form an image with a shade. However, when the image is formed on the optical disk 200 at the density (gray-scale level) of the original image, the density of the image formed on the optical disk 200 looks different from the density of the original image. That is, a halftone portion of the image becomes lighter.

The inventors compare visibility of the original image and visibility of the image formed on the optical disk 200 and confirm (experiment) how to correct the density in order to make both images look the same. Based on the result, the inventors determine values for density correction of the image. This values is hereinafter referred to visual characteristic value, and expressed by α.

In the following description, data when an image is formed on the optical disk (DVD-R) 200 is illustrated. However, data for density correction varies according to the kind of a material (dye) used in a recording layer or a color changing layer formed in the optical disk 200. Therefore, a visual characteristic value varies according to the kind of an optical disk.

Figure 4:
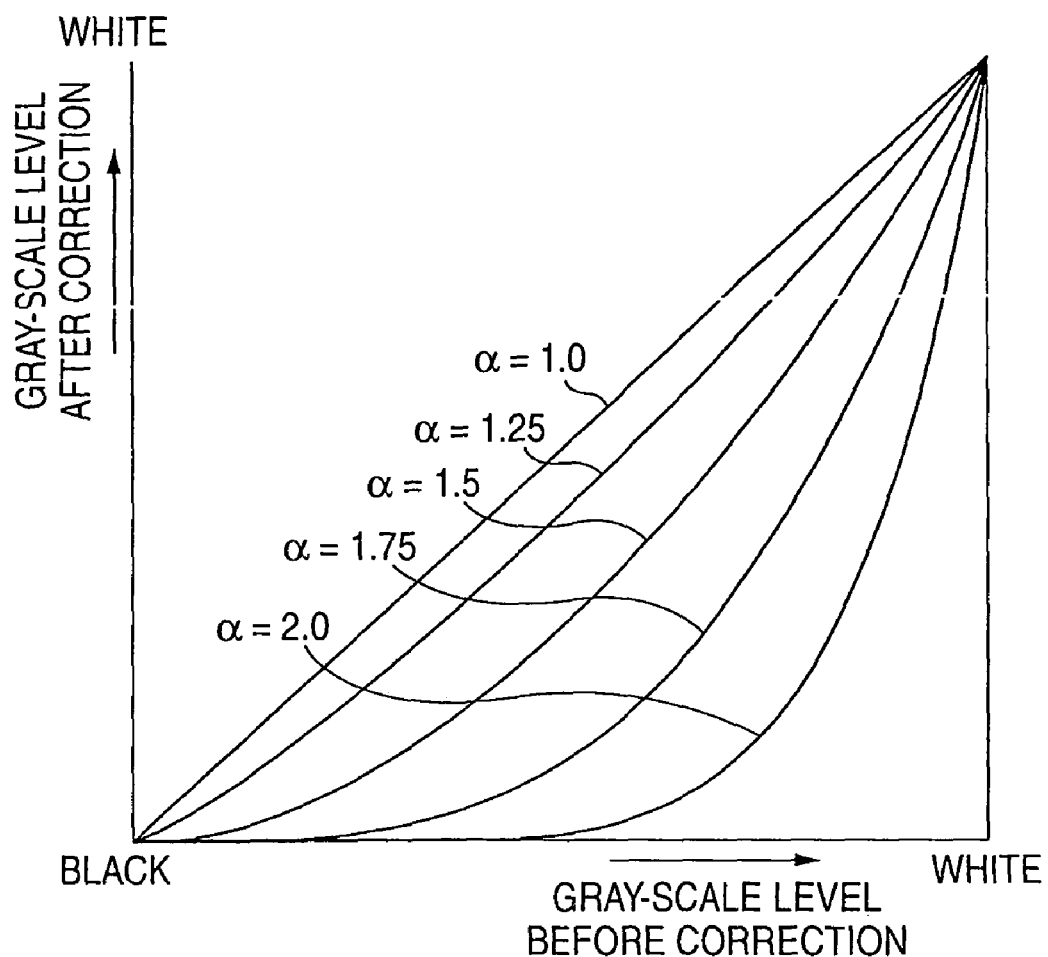
FIG. 4 is a graph showing the relationship of density conversion at each visual characteristic value $\alpha$.
Figure 5:
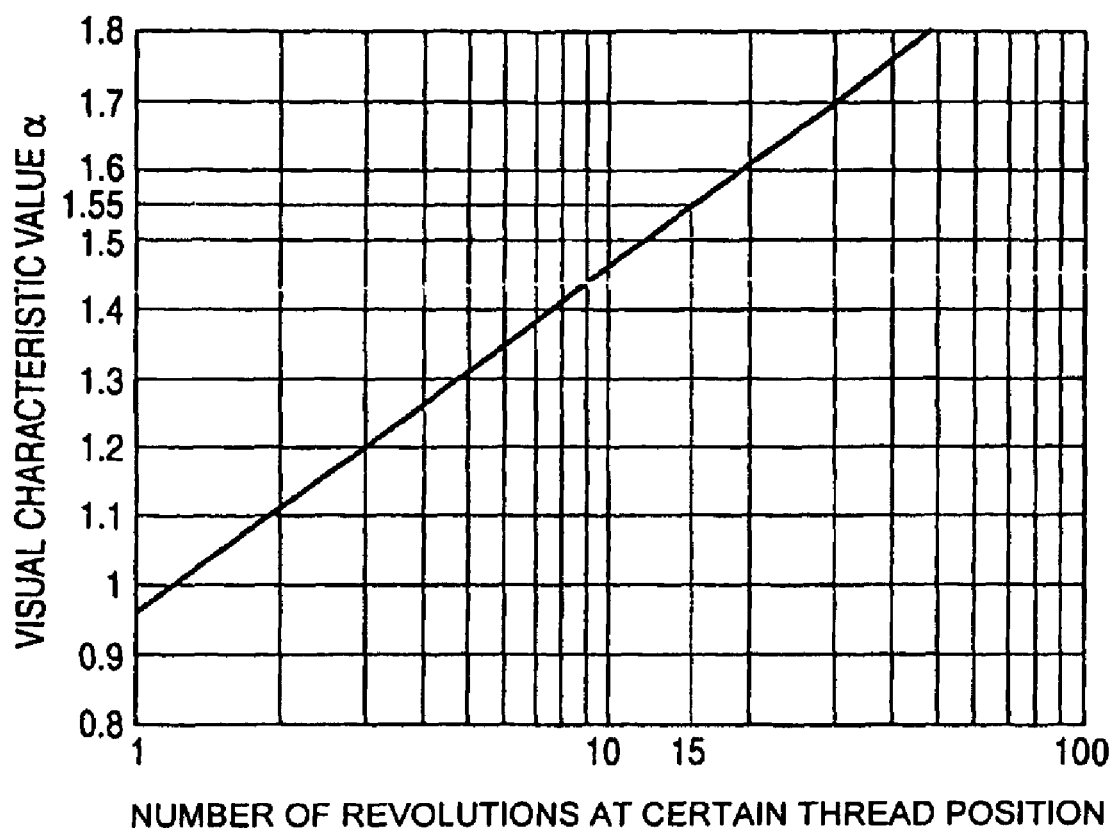
FIG. 5 is a graph showing the relationship between the number of revolutions and the visual characteristic value $\alpha$ at a certain thread position.

FIG. 4 is a graph showing the relationship of density conversion at each visual characteristic value α. FIG. 5 is a graph showing the relationship between the number of revolutions at a certain thread position and the visual characteristic value α.

As the experiment result, the relationship shown in FIG. 4 is obtained.

Equation 1

(Density After Correction)=(Density Before Correction)$^\alpha$ (where α is visual characteristic value)

From Equation 1, it can be that, when the writing density of a halftone of the image is corrected on the basis of the relationship shown in FIG. 4 so as to be darker than the pre-corrected image density, the image formed on the optical disk looks same as the original image. Further, it can be seen found that, when the image is formed on the optical disk, the relationship shown in FIG. 5 is established between the visual characteristic value α and the number of revolutions when laser light is irradiated onto the same area.

FIG. 6 is a table showing the density before correction and the density after correction when an image having 16 gray-scale levels is formed. For example, as described above, when 15 revolutions are required to form pixels for one row, that is, when an image having 16 gray-scale levels is formed, it is preferable to set the visual characteristic value α to 1.55, as shown in FIG. 5. For example, when gray-scale data is (1010), since the decimal value of the gray-scale data is 10, the density of the original image is (10/15)=(0.667), as shown in FIG. 6. However, when the image is formed on the optical disk 200 at this density, the formed image looks lighter than the original image. For this reason, the density of the image to be formed is corrected to be lighter than the pre-corrected density at a halftone writing density. On the basis of Equation 1, the density of the image to be formed on the optical disk 200 is preferably corrected to (10/15)$^{1.55}$=0.533, as shown in FIG. 6. When gray-scale data is (1000), the corrected density is (8/15)=0.533. Therefore, when the gray-scale data of the original image is (1010), the gray-scale data is corrected to (1000), thereby making visibility of the image formed on the optical disk 200 same as visibility of the original image.

As described above, when an image having 16 gray-scale levels is formed on the optical disk 200, it is preferable to correct other gray-scale data of the original image, as shown in FIG. 6. That is, gray-scale data (0000), (0001), (0010), (0011), (0100), (0101), (0110), (0111), (1000), (1001), (1010), (1011), (1100), (1101), and (1111) are corrected to gray-scale data (0000), (0000), (0001), (0001), (0010), (0011), (0100), (0101), (0110), (0111), (1001), (1001), (1011), (1100), (1101), (1110) and (1111), respectively.

Therefore, the density (shade) of the image formed on the optical disk 200 looks same as that of the original image.

When the number of revolutions is changed to form an image having no 16 gray-scale levels, as shown in FIG. 5, the visual characteristic value α is corrected to another value according to the number of revolutions, whereby the shade of the image formed on the optical disk 200 looks substantially same as the original image.

For example, when the number of revolutions when laser light is irradiated onto the same area is 31, that is, when an image 32 gray-scale levels is formed, it is preferable to correct gray-scale data using the visual characteristic value α of 1.72.

As described above, since the characteristic varies depending on the thickness or the kind of dye used in the color changing layer of the optical disk on which an image is formed, it is required to prepare density correction data for every disk to be used.

When the movement amount of the optical pick-up 100 by the stepping motor 140 is set to another value, for example, 30 μm whenever the optical disk image forming apparatus 10 forms pixels for one row on the optical disk 200, visibility of the image formed on the optical disk varies. Therefore, in this case, it is also required to prepare the density correction data.

<Gray-Scale Display>

In the optical disk image forming apparatus 10, when a mode for forming an image on the optical disk 200 is set, the control unit 170 converts image data read in the frame memory 158 into image data (of a polar coordinate system) recordable on the optical disk 200. A main control unit 170 of the optical disk image forming apparatus 10 corrects density information of each pixel on the basis of an image formation mode set by a user and the setting of the number of gray-scale levels of the image to be formed on the optical disk.

When the preparation of the image formation data and the density correction are completed, the control unit 170 outputs the image formation data to the data converter 160.

The preparation of the image formation data and the density correction may be performed by the host computer 300.

As described above, in order to form the pixels for one row, a control operation may be performed such that the irradiation locus of laser light varies every revolution. In this case, a control operation may be performed on a specified pixel such that the color of the color changing layer of the optical disk 200 is changed by the irradiation of laser light onto the optical disk 200 at a certain revolution time, whereas the color of the color changing layer may not be changed at another revolution time. With this configuration, an area ratio of a discolored portion to a non-discolored portion in the specified pixel is changed, thereby displaying the shade of the image.

Specifically, in this embodiment, the optical disk 200 is irradiated with laser light by the number of revolutions corresponding to a decimal value of the gray-scale data of the 15 revolutions required in order to forming pixels for one row, so as to change the color of the color changing layer of the optical disk. For example, when the gray-scale data having the corrected density is (0101), the optical disk 200 is irradiated with laser light having intensity capable of changing the color of the color changing layer of the optical disk for only 5 revolutions of the 15 revolutions and thus the color of the portion on the locus of laser light is changed. When the gray-scale data having the corrected density is (0011), the optical disk 200 is irradiated with laser light having intensity capable of changing the color of the color changing layer of the optical disk for only 3 revolutions of the 15 revolutions and thus the color of the portion on the locus of laser light is changed.

FIG. 7 is a table showing the conversion contents of the data converter. The data converter 160 defines the intensity of laser light for every revolution over the 15 revolutions required for forming the pixels for one row. That is, the data converter 160 converts the gray-scale data read out from the frame memory 158 into any one of a write level (ON data) and a servo level (OFF data) according to the number of revolutions based on the instruction from the main control unit 170, as shown in FIG. 7. For example, when the gray-scale data read out from the frame memory 158 is (0010), the data converter 160 converts the read gray-scale data into the ON data in the first revolution and the second revolution and outputs the converted ON data. Then, the data converter 160 converts the read gray-scale data into the OFF data in the third to fifteenth revolutions and outputs the converted OFF data.

The write level means intensity enough to change the color of the color changing layer of the optical disk when laser light is irradiated, and the servo level means intensity not causing a change in color of the color changing layer of the optical disk even though laser light is irradiated. The reason why laser light having the intensity of the servo level is output when the color of the color changing layer of the optical disk is not changed is to perform the focus control.

FIG. 8 is a diagram showing the state of one pixel whose color is changed by laser light irradiated on the basis of the gray-scale data. In each pixel shown in FIG. 8, a bold line indicates a path through which laser light of the write level is irradiated, and the change in color actually occurs. Further, a fine line (a dotted line) indicates a path through which laser light of the servo level is irradiated, and the change in color does not actually occurs. When laser light of the write level or the servo level is irradiated every revolution on the basis of the gray-scale data shown in FIG. 7, the color of one pixel is changed as shown in FIG. 8. In the optical disk image forming apparatus 10, since the gray-scale data is set for every single pixel, the image having 16 gray-scale levels is formed on the label surface of the optical disk.

<Gray-Scale Display Based on Duty Ratio>

According to the embodiment of the invention, in addition to a function of switching the intensity of laser light irradiated onto each pixel for every revolution as described above so as to give the shape to the image, a function of changing a duty ratio of laser light irradiated onto each pixel is provided. In the optical disk image forming apparatus 10, for example, 25 duty ratios can be set for one pixel.

FIG. 9 is a diagram showing a gray-scale display pattern based on the duty ratio. As shown in FIG. 9, the optical disk image forming apparatus 10 can equally divide one pixel into 24 parts in order to irradiate light onto the corresponding pixel area for an amount of time corresponding to the writing density, and change the intensity of laser light to the write level or the servo level for each part.

According to this embodiment of the invention, as shown in FIG. 9, as for any gray-scale level, the irradiation pattern of laser light is set such that laser light of the write level (ON data) is irradiated in the vicinity of the center of the pixel, while laser light of the servo level (OFF data) is irradiated in the vicinity of the end of the pixel. Then, it is possible to make the density balance of each pixel good.

Since approximately 90% of the pixel (the irradiation locus of laser light) overlap a plurality of adjacent rows, as microscopically viewed, it is difficult to distinguish the gray-scale display pattern based on the duty ratio. However, since the size of one pixel is 100 μm×10 μm, as macroscopically viewed, points of different gray-scale levels overlap each other to be slightly shifted from each other. Therefore, in the image actually formed on the optical disk, it is possible to distinguish the gray-scale display pattern without any difficulty.

As described above, the optical disk image forming apparatus 10 can display the shade of 25 gray-scale levels by changing the intensity ratio (duty ratio) of laser light irradiated onto one pixel.

As described above, when the intensity level of laser light irradiated onto each pixel is corrected every revolution and the duty ratio of laser light irradiated onto one pixel is changed, it is possible to further increase the number of gray-scale levels of the image according to the number of revolutions. For example, as described above, when one row of an image is formed by rotating the optical disk 200 fifteen times, it is possible to form an image having 400 (=25×15) gray-scale levels. Therefore, in the optical disk image forming apparatus 10 according to the embodiment of the invention, it is possible to form images having, for example, 25 to 400 gray-scale levels on the recording surface or the label surface of the optical disk 200. Accordingly, it is possible to adjust the density more finely such that the density of the image formed on the optical disk becomes same as that of the original image.

As described above, when the duty ratio for one pixel is changed to change the gray-scale display of the image, if density correction is similarly performed, it is possible to make visibility of the image formed on the optical disk 200 same as visibility of the original image.

What is claimed is:

1. An optical disk image forming apparatus that forms an image constituted by a plurality of pixels on an optical disk by irradiating laser light onto the optical disk including a color changing layer, the color changing layer being capable of changing a characteristic of a color by the laser light, the optical disk image forming apparatus comprising:

an optical disk drive that includes a rotating unit for rotating the optical disk and a laser light irradiating unit being movable in a radial direction of the optical disk; and a control unit that virtually sets a plurality of pixel areas on the optical disk, allocates predetermined writing densities to the plurality of pixel areas based on image data representing the image to be formed, respectively, and controls the optical disk drive to irradiate the laser light onto each pixel area according to the allocated writing densities, wherein, when the allocated writing density is a halftone writing density, the control unit corrects the halftone writing density so as to be darker than the allocated writing density, based on a relation between the writing density before correction by the control unit and the writing density after correction by the control unit which is changed according to a number of times or an amount of time the laser light passes each pixel area.

2. The optical disk image forming apparatus according to claim 1, wherein the control unit controls the optical disk drive to irradiate the laser light onto each pixel area by a number of times or for an amount of time corresponding to the corrected writing density.

3. The optical disk image forming apparatus according to claim 1, wherein a correction ratio of the writing density relation is defined by a coefficient for correcting the writing density by the control unit.

4. The optical disk image forming apparatus according to claim 1, wherein the control unit defines the pixel area by a central angle and a pixel length which is a length in a radial direction so that the plurality of pixel areas overlap one another at an interval shorter than the pixel length in the radial direction.

5. The optical disk image forming apparatus according to claim 1, wherein the control unit controls the laser light irradiating unit to irradiate and vibrate the laser light in the radial direction within the pixel length.

6. A method of forming an image constituted by a plurality of pixels on an optical disk by irradiating laser light onto the optical disk including a color changing layer, the color changing layer being capable of changing a characteristic of a color by the laser light, the method comprising:

virtually setting a plurality of pixel areas on the optical disk;

allocating predetermined writing densities to the plurality of pixel areas based on image data representing the image to be formed, respectively;

correcting, by a control unit, when the allocated writing density is a halftone writing density, the halftone writing density so as to be darker than the allocated writing density;

irradiating the laser light onto the optical disk with moving a laser light irradiating unit in a radial direction of the optical disk while a rotating unit rotates the optical disk based on the corrected writing density, wherein the correcting of the halftone writing density is based on a relation between the writing density before correction by the control unit and the writing density after correction by the control unit which is changed according to a number of times or an amount of time the laser light passes each pixel area.

7. The method according to claim 6 further comprising setting control condition so as to irradiate the laser light onto each pixel area by a number of times or for an amount of time corresponding to the corrected writing density, wherein the laser light is irradiated on the optical disk based on the control condition.

* * * * *